United States Patent
Lechner et al.

(10) Patent No.: US 12,258,997 B2
(45) Date of Patent: Mar. 25, 2025

(54) WALL ANCHOR

(71) Applicant: GEBERIT INTERNATIONAL AG, Jona (CH)

(72) Inventors: Manuel Lechner, Kaltbrunn (CH); Urs Späni, Wollerau (CH)

(73) Assignee: GEBERIT INTERNATIONAL AG, Jona (CH)

( * ) Notice: Subject to any disclaimer, the term of this patent is extended or adjusted under 35 U.S.C. 154(b) by 66 days.

(21) Appl. No.: 18/170,605

(22) Filed: Feb. 17, 2023

(65) Prior Publication Data

US 2023/0265874 A1 Aug. 24, 2023

(30) Foreign Application Priority Data

Feb. 21, 2022 (EP) .................................. 22157790

(51) Int. Cl.
F16B 7/04 (2006.01)
E03D 11/14 (2006.01)

(52) U.S. Cl.
CPC ............ *F16B 7/046* (2013.01); *E03D 11/143* (2013.01)

(58) Field of Classification Search
CPC ........ F16B 7/046; F16B 37/042; F16B 7/187; F16B 37/045; F16B 37/04; F16B 7/18; E03D 11/143; E03C 1/322
USPC ............ 248/231.91, 297.21, 223.41, 224.51, 248/224.61, 222.52, 222.51; 52/710; 411/172
See application file for complete search history.

(56) References Cited

U.S. PATENT DOCUMENTS

| | | | | |
|---|---|---|---|---|
| 2,249,923 A | * | 7/1941 | Whitcombe | F16B 37/045 411/85 |
| 2,572,588 A | * | 10/1951 | Bedford, Jr. | F16B 37/042 411/173 |
| 5,489,173 A | * | 2/1996 | Hofle | F16B 37/046 411/85 |
| 2002/0090277 A1 | * | 7/2002 | LeVey | F16B 37/042 411/172 |
| 2010/0200714 A1 | * | 8/2010 | Persson | F16M 13/02 248/231.91 |

FOREIGN PATENT DOCUMENTS

| | | |
|---|---|---|
| DE | 25 34 059 A1 | 2/1976 |
| DE | 92 08 413 U1 | 9/1992 |
| DE | 92 16 799 U1 | 3/1993 |
| DE | 299 16 234 U1 | 12/1999 |
| DE | 299 12 434 U1 | 11/2000 |

(Continued)

OTHER PUBLICATIONS

European Search Report for 22 15 7790 dated Jul. 21, 2022.

*Primary Examiner* — Christopher Garft
(74) *Attorney, Agent, or Firm* — Sughrue Mion, PLLC

(57) ABSTRACT

A wall anchor (1), having an anchor plate (2) with a front face (3) and a rear face (4), a fixing portion (5) which protrudes from the front face (4) of the anchor plate (2), which extends along a centre axis (M) and has a threaded structure (6) for receiving an anchor bolt (7), and two hooks (8, 9) which protrude from the rear face (4) of the anchor plate (2). The hooks (8, 9) are configured such that the wall anchor (1) can be fixedly connected to a profile rail (18) by protrusions (21) of a profile rail (18), with respect to forces acting in the direction of the centre axis (M).

37 Claims, 8 Drawing Sheets

(56) References Cited

FOREIGN PATENT DOCUMENTS

| | | |
|---|---|---|
| DE | 20 2004 005 819 U1 | 7/2004 |
| DE | 20 2016 102 455 U1 | 8/2017 |
| EP | 0 713 018 A1 | 5/1996 |
| FR | 2 280 827 A1 | 2/1976 |
| GB | 653534 A | 2/1948 |

* cited by examiner

WALL ANCHOR

TECHNICAL FIELD

The present invention relates to a wall anchor according to claim 1, and an arrangement with the wall anchor according to claim 10.

PRIOR ART

Mounting frames for mounting sanitary fittings are known from the prior art. Such mounting frames are typically attached to a fixed supporting structure, such as a building wall, by means of an anchor bolt and a wall anchor.

DE 299 16 234 U1 discloses a fast fixing in which a C-rail is attached to a wall. An angle bracket is connected to the C-rail via a screw connection. The screw connection must be tightened with a tool.

DE 92 08 413 U1 describes a structure similar to that of DE 299 16 234 U1. Here, a hook-headed bolt is suspended in the profile rail. The hook-headed bolt is secured with a nut and a washer.

The above fixing concepts have the disadvantage that mounting of the structures is very complex and several elements must be operated for fixing the anchor bolt.

SUMMARY OF THE INVENTION

Starting from the prior art, it is an object of the invention to provide a wall anchor which overcomes the disadvantages of the prior art. In particular, it is an object to provide a wall anchor which can easily be connected to a profile rail without tools.

This object is achieved with a wall anchor according to claim 1. Accordingly, a wall anchor comprises an anchor plate with a front face and a rear face, a fixing portion which protrudes from the front face of the anchor plate and that extends along a centre axis and has a threaded structure for receiving an anchor bolt, and two hooks which protrude from the rear face of the anchor plate, wherein the hooks are configured such that the wall anchor can be fixedly connected to a profile rail by means of protrusions of a profile rail, with respect to forces acting in the direction of the centre axis.

The arrangement of the hooks has the advantage that a connection to the profile rail can be provided which can be created without the use of a tool. The wall anchor can thus be easily but nonetheless fixedly connected to the profile rail.

In other words, the hooks grip on the protrusions of the profile rail such that the engagement remains firm under the effect of force in the direction of the centre axis. There is accordingly no movement between wall anchor and profile rail. The force may act on the wall anchor both towards the profile rail and away from the profile rail.

The two hooks are arranged spaced apart from one another such that the hooks engage on two different sides of the profile rail.

The two hooks each have an undercut, wherein each undercut receives a protrusion of the profile rail.

The hooks are configured such that the hooks grip around the protrusions of the profile rail.

Preferably, the hooks and the protrusions are configured such that the hook can be displaced in the direction of the profile axis of the profile rail while being connected to the profile rail.

Preferably, the hooks are configured such that the wall anchor can be inserted in the profile rail by means of a pivot movement executed about the centre axis. This ensures that the hook can be mounted without further deflection transversely to the profile rail.

Preferably, the pivot movement is a pivot movement through an angle of 10° to 45°.

Preferably, the two hooks are arranged opposite one another with respect to the centre axis. Each of the hooks has a hook base extending away from the rear face and a hook portion adjoining the hook base and extending away inclined at an angle to the hook base. The hook portion extends away from the hook base towards the outside with respect to the centre axis.

The hook base and the hook portion define the above-mentioned undercut or a receiving space for receiving the protrusion of the profile rail. The undercut or receiving space is open towards the outside, i.e. away from the centre axis.

Preferably, one of the hooks has a hook base convexly curved about the centre axis, and the other of the hooks preferably has a hook base formed as a flat surface.

During the pivot movement, the convexly curved hook base can roll on the protrusion.

Preferably, at least one of the hooks has a stop face which is oriented substantially perpendicularly to the centre axis. The stop face ensures that the wall anchor stops on a base leg of the profile rail which lies between the two protrusions. The stop face substantially adjoins the hook portion.

Particularly preferably, both hooks have a stop face, which lie in a common plane extending at right angles to the centre axis.

Preferably, a free intermediate space is arranged between the two hooks. The free intermediate space at the anchor plate is delimited by the rear face and at the side by the two hooks. The free intermediate space has the advantage that the screw head of a fixing bolt, by means of which the profile rail is attached to a supporting structure, can protrude into the intermediate space.

Preferably, the anchor plate has a side face between the front face and the rear face, wherein the side face at one of the hooks is configured as a rounding and wherein the side face at the other of the hooks is formed with a first surface portion and a second surface portion, wherein the two surface portions are flat surfaces which stand inclined at an angle to one another.

The rounding and the two surface portions allow the above-mentioned pivot movement on insertion of the wall anchor. The angle between the two flat surface portions preferably corresponds to the pivot angle through which the wall anchor is pivoted for mounting on the profile rail.

Preferably, the centre axis and the fixing portion lie closer to one of the two hooks than the other of the two hooks. In other words, the fixing portion lies asymmetrically between the two hooks.

Preferably, the anchor plate has a region in which neither one of the two hooks nor the fixing portion lies, such that in said region a passage hole can be made for the passage of a screw. This achieves the advantage that the wall anchor can be attached to the supporting structure by a screw. This means that the wall anchor can be used without the profile rail mentioned below, which extends the usage possibilities.

Preferably, the fixing portion has a length of 25 to 100 mm from the front face to its free end.

Preferably, the wall anchor is formed as one piece. Preferably, the wall anchor is made of metal, in particular a zinc die-casting. The wall anchor may however also be made of plastic, in particular fibre-reinforced or glass-fibre-reinforced plastic.

An arrangement comprises a wall anchor according to the above description and a profile rail. The profile rail has a base leg and two side legs protruding from the base leg. Each of the side legs has a protrusion which protrudes into the region between the two side legs and in which said hooks engage.

The protrusion extends over the total length of the profile rail. The protrusion has a shape which is formed according to the shape of the hooks, so that the hook can receive the protrusion. The inner shape of the hook substantially corresponds to the outer shape of the protrusion.

Preferably, the base leg is formed substantially flat and the protrusion directly adjoins the base leg. The side leg extends from the protrusion as a flat leg, preferably at an angle of 90° to the base leg.

Preferably, the base leg has a plurality of breakthroughs through which a fixing screw can be passed, wherein the screw head of the fixing screw comes to lie between the two protrusions.

Preferably, the fixing portion protrudes out of the intermediate space between the two side legs. The fixing portion accordingly extends out of the profile. Particularly preferably, the threaded structure lies substantially outside the interior space.

Preferably, the stop face of the at least one hook comes into contact with the base leg.

Preferably, a type of clamping effect is achieved.

Preferably, the arrangement furthermore comprises a bottom rail and a mounting frame. The bottom rail has a receiving space, and at least one foot support of the mounting frame can be placed in the receiving space. The mounting frame is pivotable relative to the bottom rail, wherein at the upper end of the mounting frame, at least one anchor bolt is rotatably mounted in a fixing opening in the mounting frame, wherein the anchor bolt is in engagement with the threaded structure. Preferably, for each mounting frame, two anchor bolts and two wall anchors are provided.

The mounting frame preferably comprises fixing structures for fixing at least one sanitary fitting such as a toilet bowl, a wash stand, a urinal, a cistern etc.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
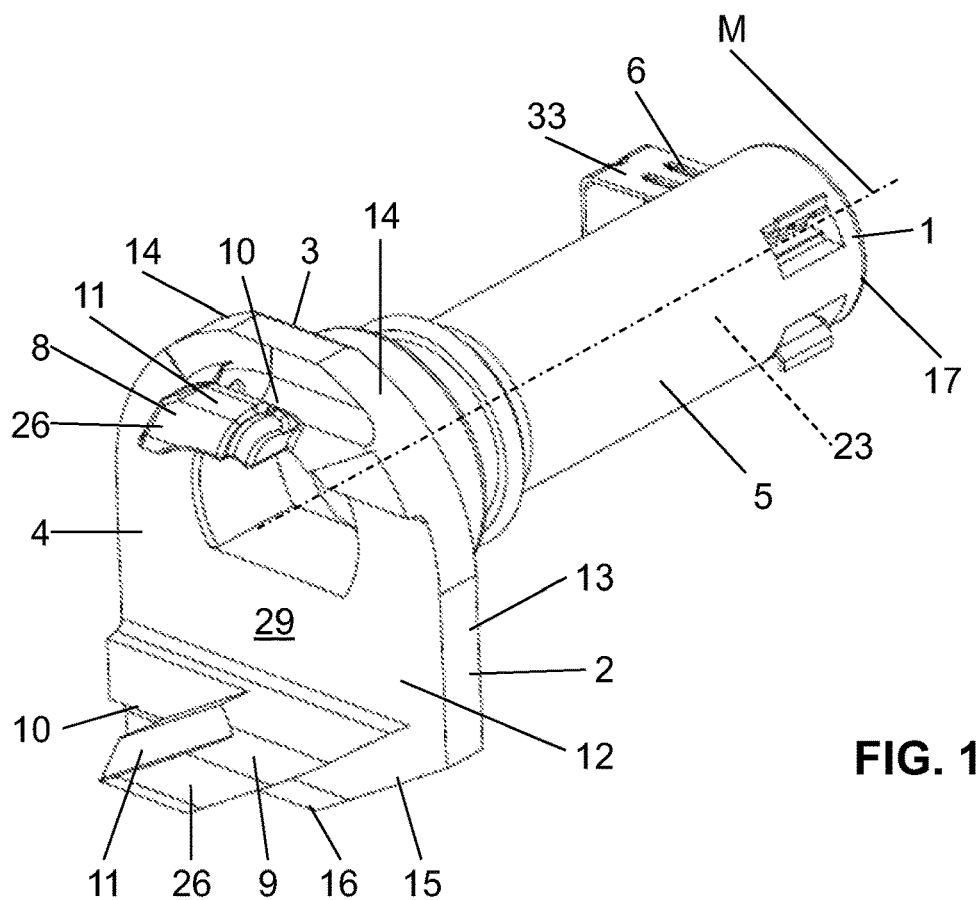
FIG. 1 shows a perspective view of a wall anchor according to a first embodiment of the present invention.
Figure 2:
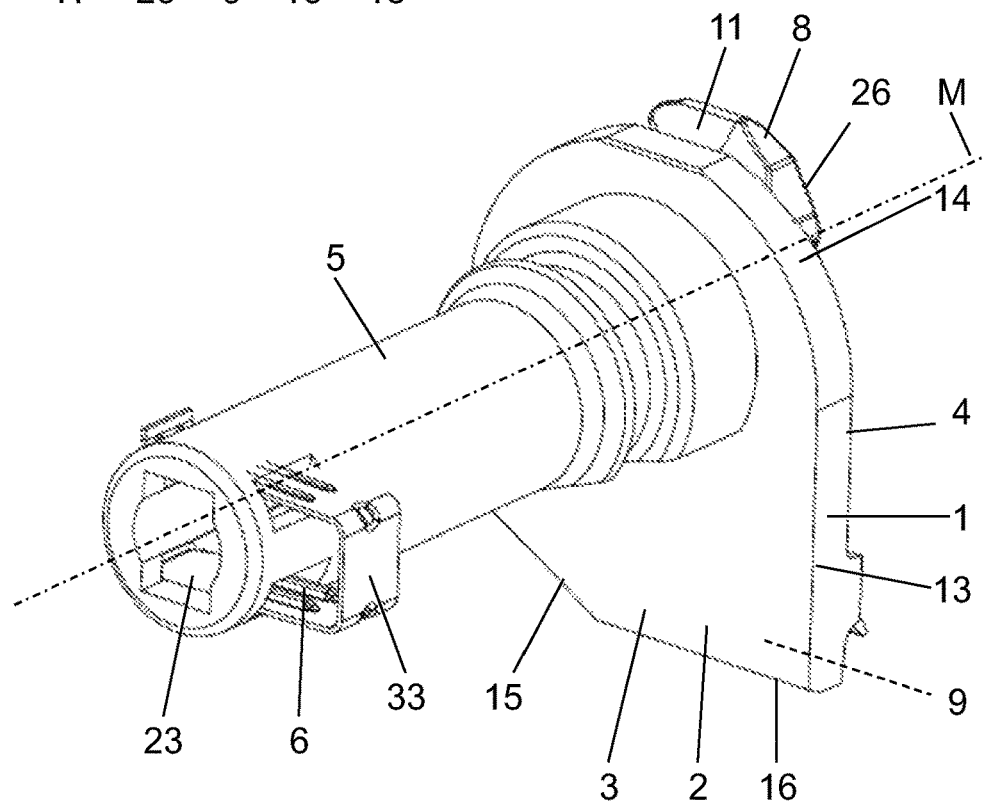
FIG. 2 shows a further perspective view of the wall anchor from FIG. 1.
Figure 3:
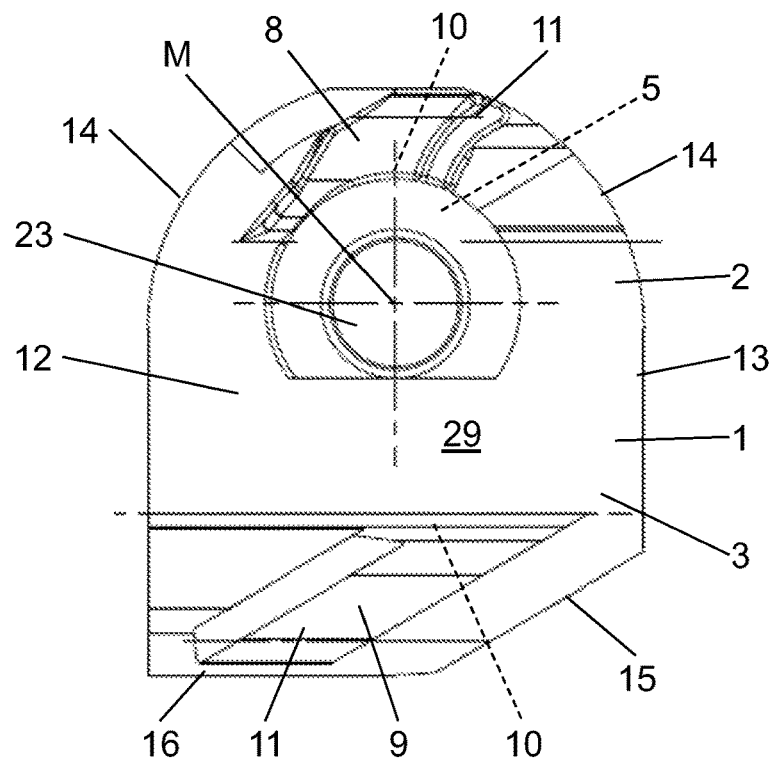
FIG. 3 shows a rear view of the wall anchor from FIG. 1.

FIGS. 1 to 4 show various views of the wall anchor 1 according to the invention. The wall anchor 1 comprises an anchor plate 2, a fixing portion 5 and two hooks 8, 9.

The anchor plate 2 comprises a front face 3 and the rear face 4. The front face 3 and the rear face 4 are connected to a side face 13.

Figure 10:
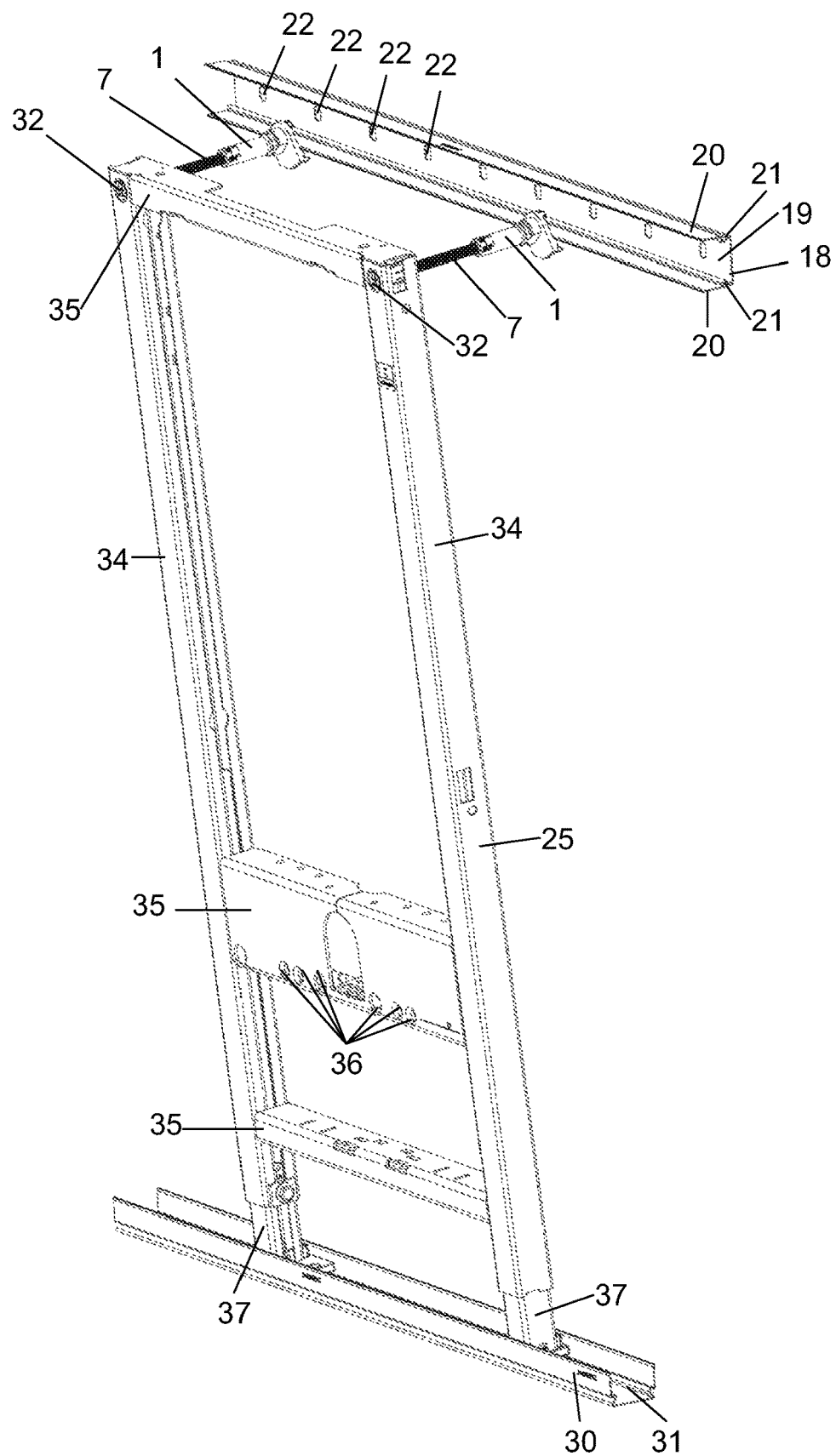
FIG. 10 shows a perspective view of a further development of the arrangement according to the preceding FIGS. 5 to 9 with a mounting frame during mounting.
Figure 12:
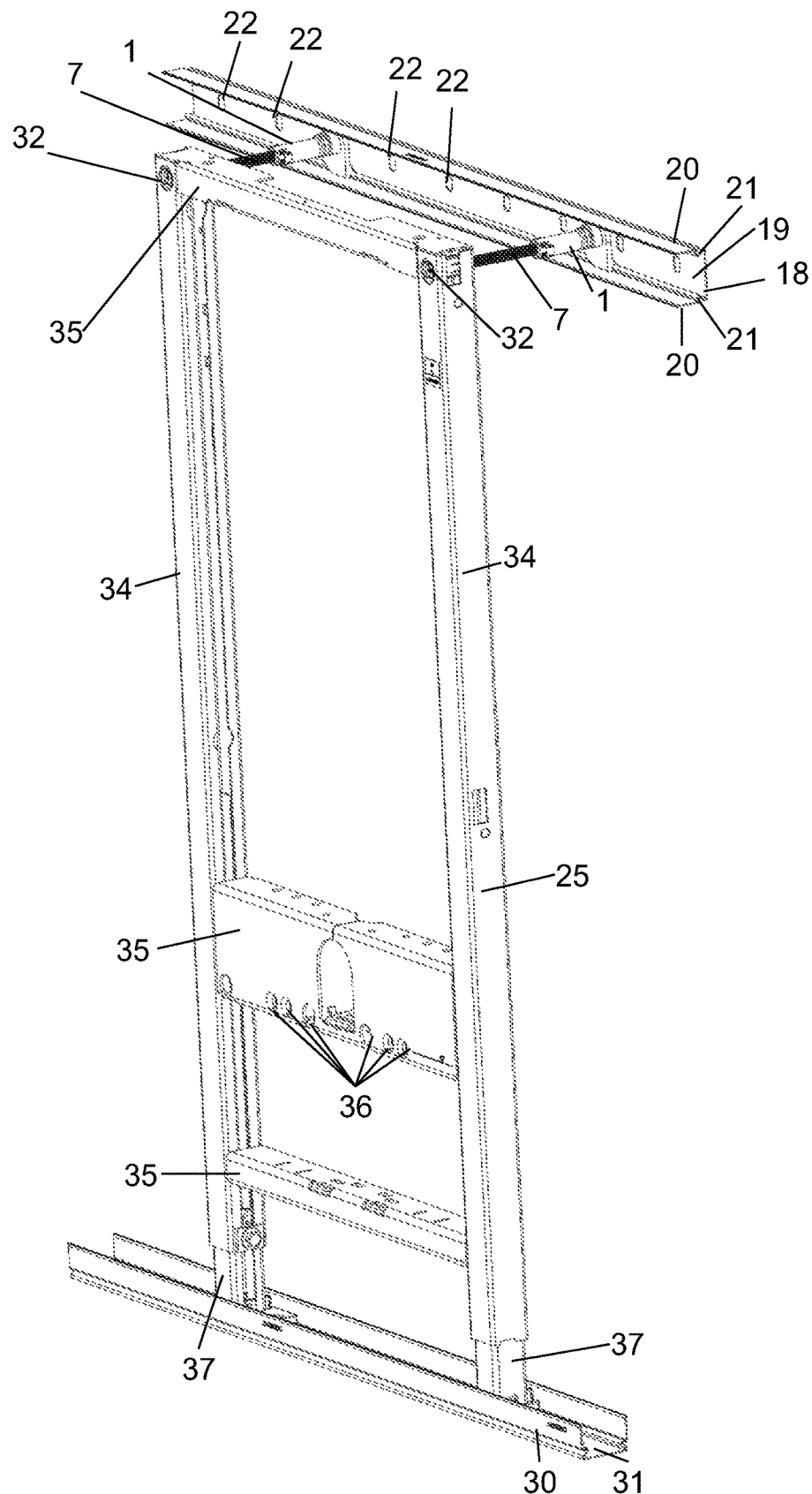
FIG. 12 shows a perspective view according to FIGS. 10 and 11 in mounted state.

The fixing portion 5 protrudes from the front face 3 along a centre axis M. The anchor plate 2 and the fixing portion 5 are here formed integrally with one another. The fixing portion 5 in the embodiment shown has the form of a cylinder. An opening 23 extends through the fixing portion in the direction of the centre axis M. The opening 23 serves to receive an anchor bolt 7 via which a mounting frame 25 can be fixed to the wall anchor 1. The anchor bolt 7 and mounting frame 25 are shown in FIGS. 10 and 12.

The fixing portion 5 furthermore has a threaded structure 6 in which the anchor bolt 7 can be screwed. The threaded structure 6 is here part of a bracket element 33 which can be inserted in the opening 23, radially to the opening 23, so that the threaded structure 6 can be moved from an engagement position into a fast adjustment position. In the engagement position, the threaded structure lies in the opening 23 such that the anchor bolt 7 can be screwed into the threaded structure 6. In the fast adjustment position, the threaded structure 6 lies outside the opening 23 such that the anchor bolt 7 can be displaced in a longitudinal movement relative to the opening 23.

The two hooks 8, 9, as shown in FIGS. 1 to 4, protrude from the rear face 4 of the anchor plate 2. The two hooks 8, 9 are configured such that the wall anchor 1 can be connected to protrusions 21 of the profile rail 19. The connection is such that the connection between the wall anchor 1 and the profile rail 18 is fixed relative to forces acting in the direction of the centre axis M. In the mounted state, the wall anchor 1 is firmly connected to the profile rail 18 via its protrusions 21, with respect to forces in the direction of the centre axis M.

Figure 6:
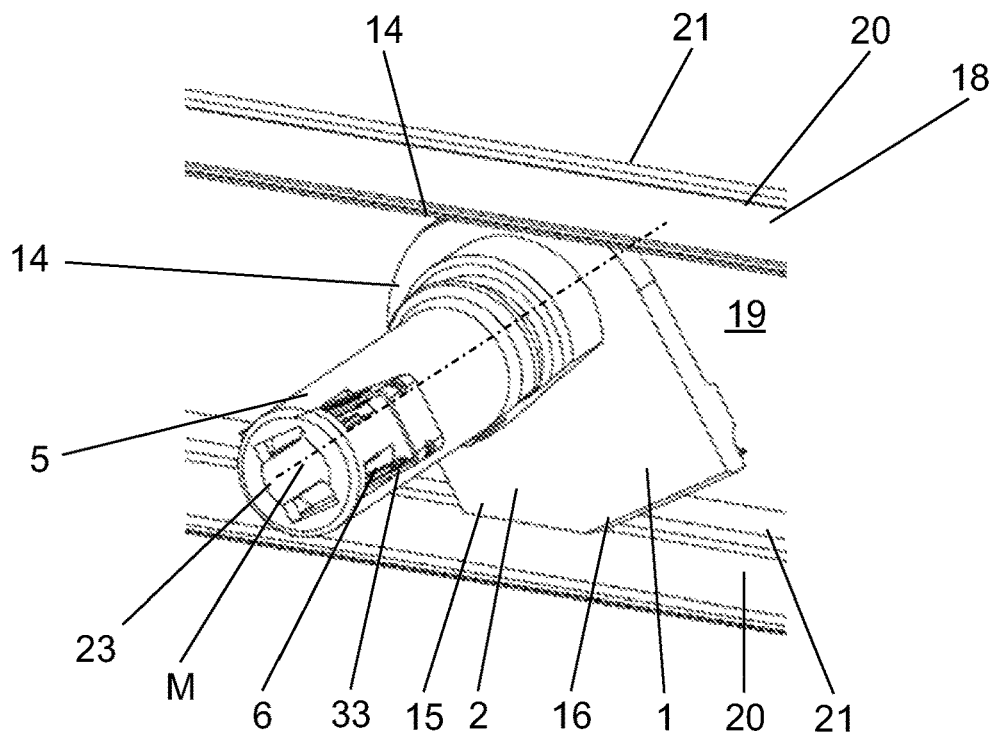
FIG. 6 shows a further view according to FIG. 5 with partially inserted wall anchor.
Figure 7:
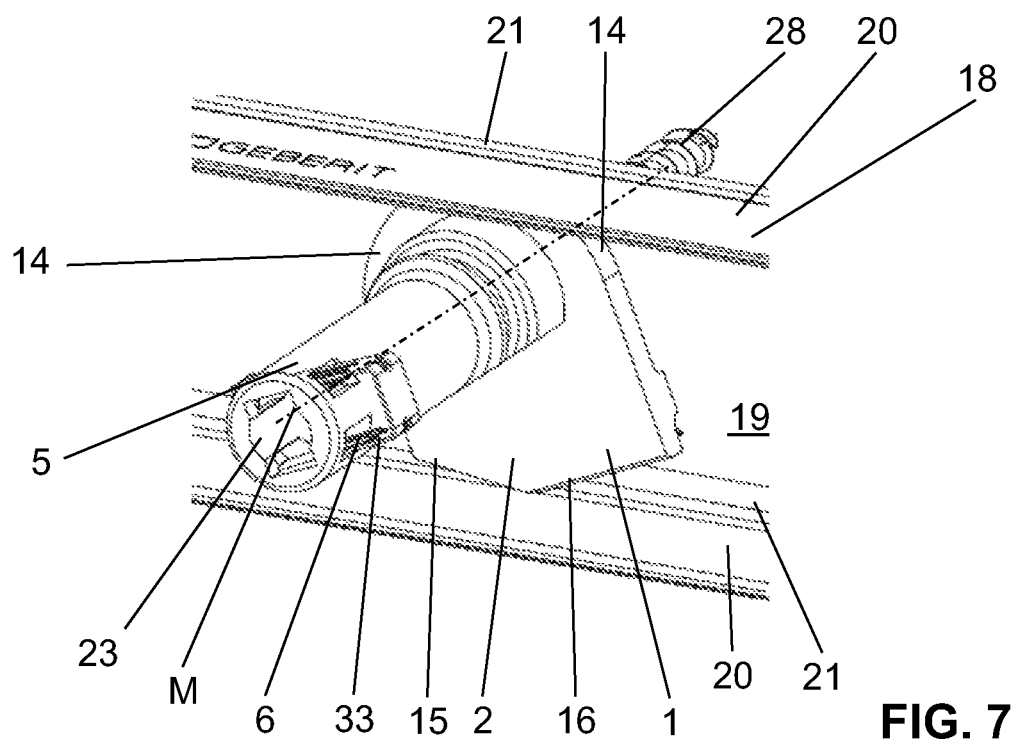
FIG. 7 shows a further view according to FIG. 5 with partially inserted wall anchor.
Figure 8:
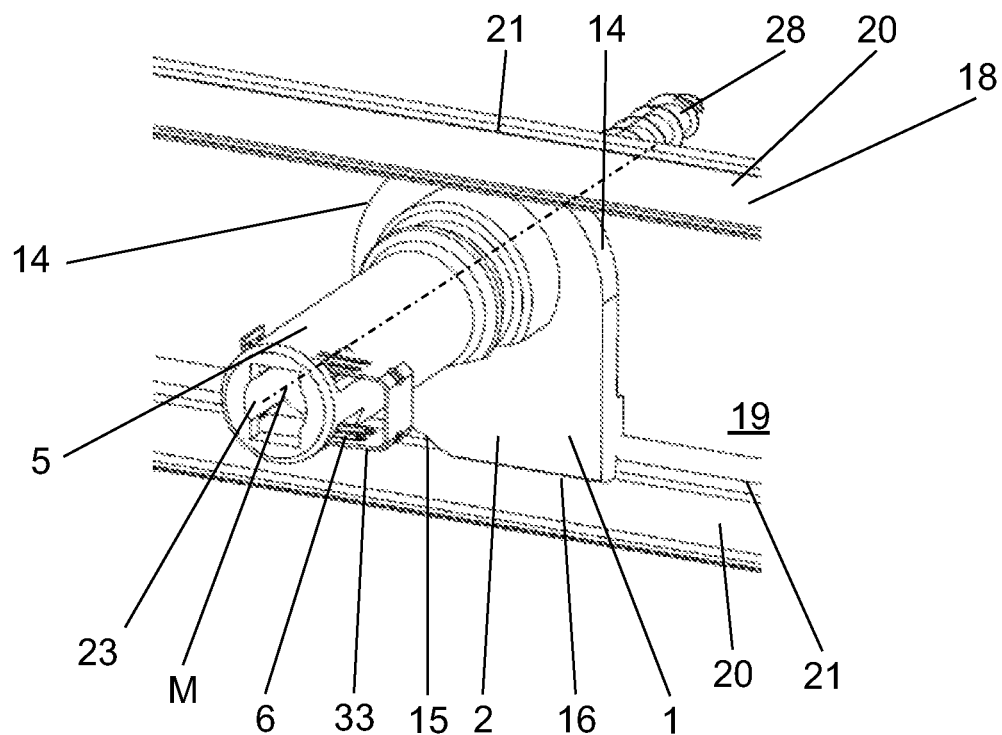
FIG. 8 shows a further view according to FIG. 5 with fully inserted wall anchor.

The hooks 8, 9 are configured such that the wall anchor 1 can be inserted in the profile rail 18 via a pivot movement executed about the centre axis M. In FIGS. 5 to 9, this pivot movement is shown in more detail. The wall anchor 1 is here inserted in the profile rail 18 in the orientation shown in FIGS. 5 and 6. Then the wall anchor 1 is pivoted about the centre axis M. FIG. 7 shows an intermediate position during the pivoting. In FIG. 8, the wall anchor 1 is shown in the fully mounted position. In the mounted or inserted position, the hooks 8, 9 grip around the protrusion 21 so that the above-described connection can be achieved.

Figure 4:
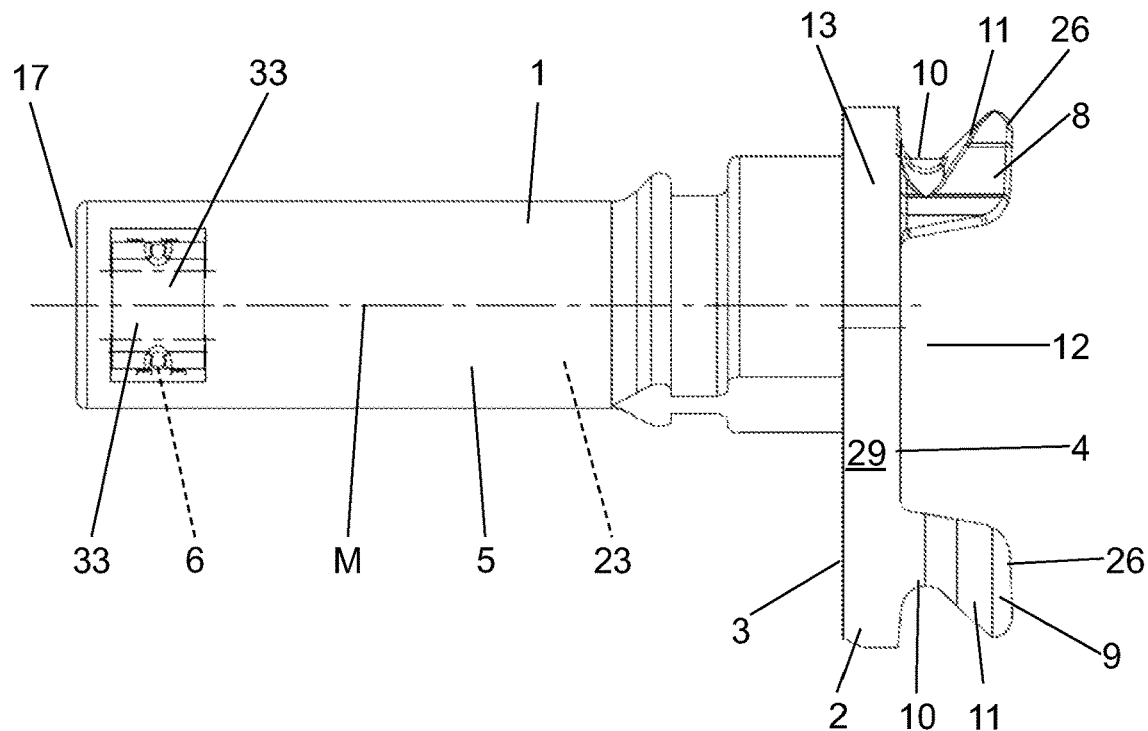
FIG. 4 shows a side view of the wall anchor from FIG. 1.
Figure 5:
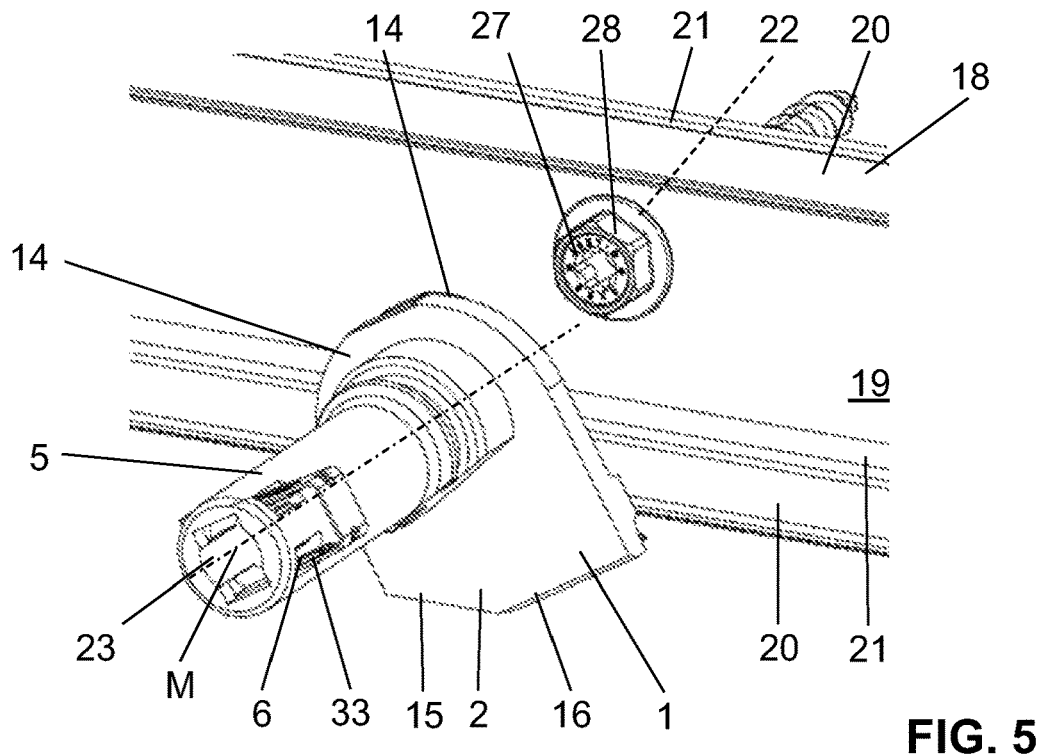
FIG. 5 shows a perspective view of an arrangement with a wall anchor according to the preceding figures and a profile rail before insertion of the wall anchor.
Figure 9:
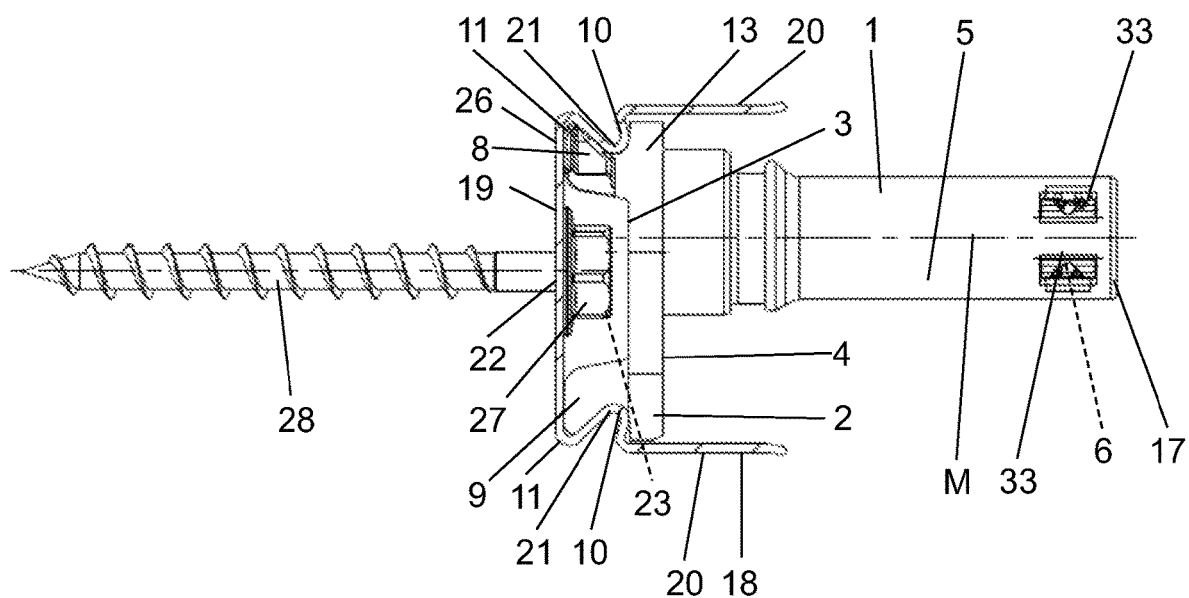
FIG. 9 shows a side view according to FIG. 8.

The shape of the two hooks 8, 9 is now explained using the illustrations in FIGS. 4 and 9. The hooks 8, 9 are arranged opposite one another relative to the centre axis M. Each of the hooks 8, 9 has a hook base 10 extending away from the rear surface 4. A hook portion 11 extends towards the outside from the hook base 10, radially from the centre axis M and inclined at an angle to the centre axis M. The hook base 10 and the hook portion 11 each form a receiving space or undercut which receives the protrusion 21.

One of the two hooks, hook 8 in the figures, has a hook base 10 which is convexly curved around the centre axis. The pivot movement explained above with reference to FIGS. 5 to 8 is executed via this convexly curved hook base 10. The other of the two hooks, hook 9 in the figures, has a hook base 10 configured as a flat surface.

In the embodiment shown, both hooks 8, 9 have a stop surface 26 which is oriented substantially at right angles to the centre axis M. The wall anchor 1 stands with the stop surface 26 on a base leg 19 of the profile rail 18.

The hooks 8, 9 are arranged such that a free intermediate space 12, visible in FIGS. 4 and 9, is arranged between the two hooks 8, 9. The hooks 8, 9 are thus spaced apart from one another. The free intermediate space 12 has the advantage that a screw head 27 of the fixing screw 28, which attaches the profile rail 18 to a supporting structure, can protrude into the intermediate space 12. In other words, the wall anchor 1 can be positioned on the profile rail 18 irrespective of the positioning of the fixing screw 28.

In the embodiment shown, the side face 13 at hook 8 is formed as a rounding. Preferably, the side face 13 is formed as a rounding at the hook which has the convexly curved hook base 10. The side face 13 at hook 9 has a first surface portion 15 and a second surface portion 16. The two surface portions 15, 16 are configured as flat surface portions which stand inclined at an angle to one another. On insertion of the wall anchor 1 in the profile rail 18, the first surface portion 15 runs parallel to a side leg 20 of the profile rail 18 before pivoting of the wall anchor 1. After pivoting of the wall anchor 1, the second surface portion 16 runs parallel to said side leg 20.

It is furthermore evident from the side views of FIGS. 4 and 9 that the fixing portion 5 is arranged closer to the hook 8 than to the hook 9.

Furthermore, the anchor plate 8 has a region 29 in which neither one of the two hooks 8, 9 nor the fixing portion 5 lies. This allows an installer to provide a passage hole in the region 29 in order to attach the wall anchor 1 without the profile 18, using a screw not shown in the figures.

The fixing portion 5 has a length of 25 to 100 millimeter from the front face 3 to its free end 17. In other embodiments, the fixing portion 5 may also be longer or shorter.

An arrangement as shown in FIGS. 5 to 9 comprises the profile rail 18 and at least one wall anchor 1. The profile rail 18 has a base leg 19 and two side legs 20 protruding from the base leg 19. Each of the side legs 20 has a protrusion 21. The protrusion 21 protrudes into the region between the two side legs 20.

The base leg 19 is formed substantially flat and in the installation position lies flat on the supporting structure. The base leg 19 typically has a plurality of breakthroughs 22. The breakthroughs 22 each serve to receive a fixing screw 28, the screw heads 29 of which come to lie between the two protrusions 21.

Figure 11:
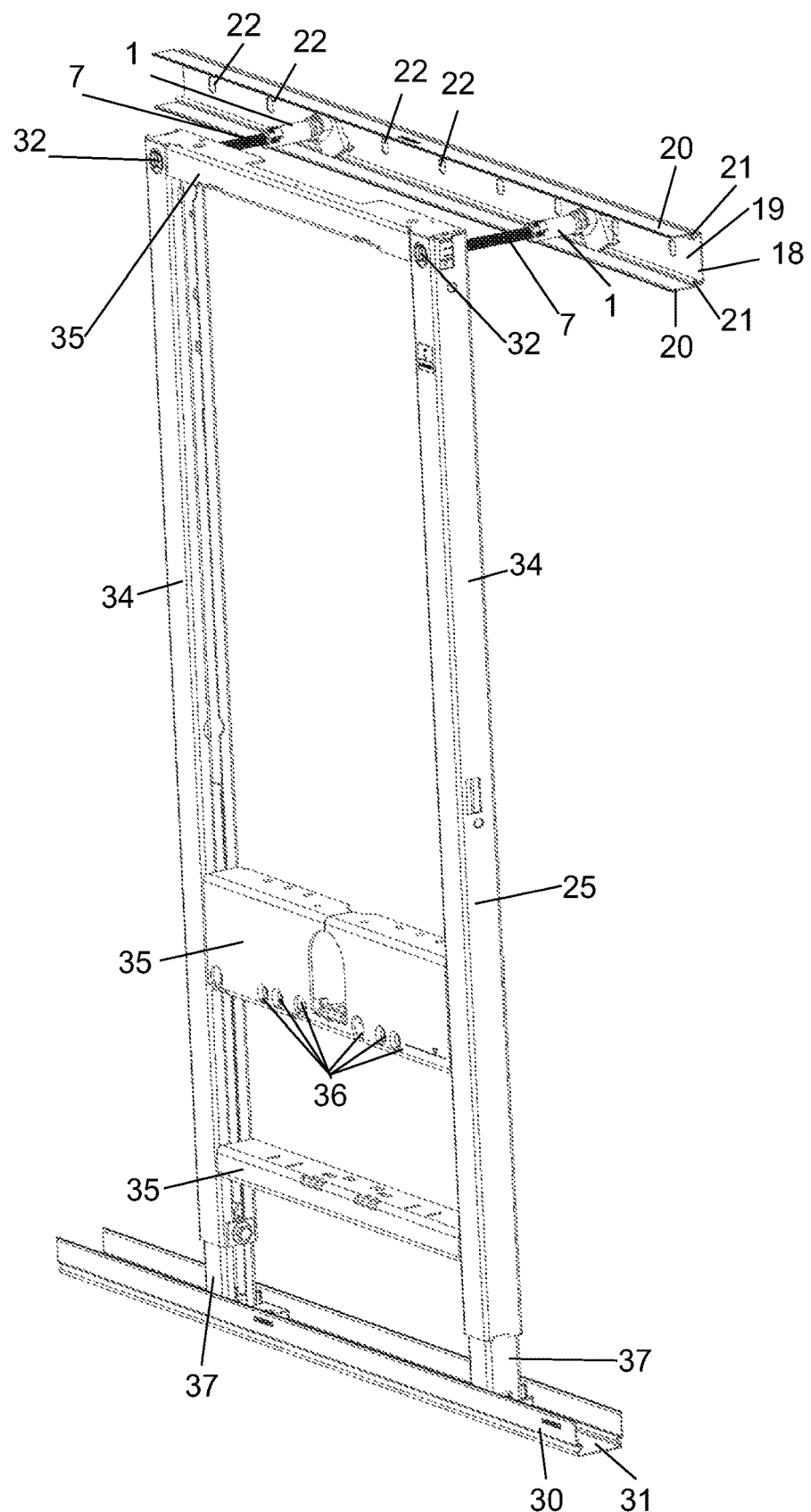
FIG. 11 shows a perspective view according to FIG. 10 during mounting.

FIGS. 10 to 12 show a further development of the arrangement. The further development of the arrangement furthermore comprises a bottom rail 30 and a mounting frame 25. The bottom rail 30 has a receiving space 31 and is typically fixedly mounted on a building floor. Preferably, the bottom rail 30 and the profile rail 18 are identical. The mounting frame 25 has at least one foot support 37. The mounting frame 25 is placed with its at least one foot support 37 in the receiving space 31 and is then pivoted via a pivot movement relative to the profile rail 18. At the upper end, the mounting frame 25 has at least one fixing opening 32 in which an anchor bolt 7 is inserted. Here, two fixing openings 32 for two anchor bolts 7 are provided. The anchor bolt 7 is here in engagement with a wall anchor 1 as described above. The anchor bolt 7 is in engagement with the threaded structure 6 of the wall anchor 1. During mounting of the mounting frame 25, the at least one wall anchor 1 together with the mounting frame 25 is pivoted towards the profile rail 18. The pivot axis of the mounting frame 25 lies in the bottom rail 30. The at least one wall anchor 1, as shown in FIG. 6, is here moved into the profile rail 18 via the pivot movement of the mounting frame 25. The at least one wall anchor 1 can be connected to the profile rail 18 via the pivot movement described above and shown in FIGS. 6 and 7, about the centre axis M.

In the embodiment shown, the mounting frame 25 has two vertical supports 34 spaced apart from one another which are connected via crosspieces 35. The crosspieces 35 have fixing structures 36, such as threaded openings or similar, on which a sanitary fitting may be attached.

LIST OF REFERENCE SIGNS

| | |
|---|---|
| 1 | Wall anchor |
| 2 | Anchor plate |
| 3 | Front face |
| 4 | Rear face |
| 5 | Fixing portion |
| 6 | Threaded structure |
| 7 | Anchor bolt |
| 8 | Hook |
| 9 | Hook |
| 10 | Hook base |
| 11 | Hook portion |
| 12 | Free intermediate space |
| 13 | Side face |
| 14 | Rounding |
| 15 | First surface portion |
| 16 | Second surface portion |
| 17 | Free end |
| 18 | Profile rail |
| 19 | Base leg |
| 20 | Side leg |
| 21 | Protrusion |
| 22 | Breakthroughs |
| 23 | Openings |
| 25 | Mounting frame |
| 26 | Stop face |
| 27 | Screw head |
| 28 | Fixing screw |
| 29 | Region |
| 30 | Bottom rail |
| 31 | Receiving space |
| 32 | Fixing opening |
| 33 | Bracket element |
| 34 | Vertical support |
| 35 | Crosspiece |
| 36 | Fixing structure |
| 37 | Foot support |
| M | Centre axis |

The invention claimed is:
1. A wall anchor, comprising:
an anchor plate with a front face and a rear face,
a fixing portion which protrudes from the front face of the anchor plate, which extends along a center axis and has a threaded structure for receiving an anchor bolt, and
two hooks which protrude from the rear face of the anchor plate, wherein the hooks are configured such that the wall anchor can be fixedly connected to a profile rail by protrusions of a profile rail, with respect to forces acting in the direction of the center axis;

wherein the anchor plate has a side face between the front face and the rear face, wherein the side face at one of the hooks is configured as a rounding and wherein the side face at the other of the hooks is formed with a first surface portion and a second surface portion, wherein the two surface portions are flat surfaces which stand inclined at an angle to one another.

2. The wall anchor according to claim 1, wherein the hooks are configured such that the wall anchor is insertable in the profile rail by a pivot movement executed about the center axis.

3. The wall anchor according to claim 1, wherein the two hooks are arranged opposite one another with respect to the center axis, wherein each of the hooks has a hook base extending away from the rear face and a hook portion adjoining the hook base and extending away inclined at an angle to the hook base, wherein the hook portion extends away from the hook base towards the outside with respect to the center axis.

4. The wall anchor according to claim 1, wherein one of the hooks has a hook base convexly curved about the center axis and the other of the hooks preferably has a hook base formed as a flat surface.

5. The wall anchor according to claim 1, wherein at least one of the hooks has a stop face which is oriented substantially perpendicularly to the center axis.

6. The wall anchor according to claim 1, wherein a free intermediate space is arranged between the two hooks.

7. The wall anchor according to claim 1, wherein the center axis and the fixing portion lie closer to one of the two hooks than the other of the two hooks; and/or wherein the anchor plate has a region in which neither one of the two hooks nor the fixing portion lies, such that in said region a passage hole can be made for the passage of a screw.

8. The wall anchor according to claim 1, wherein the fixing portion has a length of 25 to 100 mm from the front face to its free end; and/or wherein the wall anchor is formed as one piece; and/or wherein the wall anchor is made of metal, in particular a zinc die-casting, or of plastic, in particular fiber-reinforced or glass fiber-reinforced plastic.

9. An arrangement comprising a wall anchor and a profile rail,
wherein said wall anchor comprises
an anchor plate with a front face and a rear face,
a fixing portion which protrudes from the front face of the anchor plate, which extends along a center axis and has a threaded structure for receiving an anchor bolt, and
two hooks which protrude from the rear face of the anchor plate, wherein the hooks are configured such that the wall anchor can be fixedly connected to the profile rail by protrusions of the profile rail, with respect to forces acting in the direction of the center axis,
wherein the profile rail has a base leg and two side legs protruding from the base leg, wherein each of the side legs has one of the protrusions which protrudes into the region between the two side legs and in which said hooks engage; and
wherein the base leg is formed substantially flat and wherein each protrusion is directly adjoined to the base leg, and each side leg extends from the corresponding protrusion as a flat leg.

10. The arrangement according to claim 9, wherein the side leg extends at an angle of 90° to the base leg.

11. The arrangement according to claim 9, wherein the base leg has a plurality of breakthroughs through which a fixing screw can be passed, wherein the screw head of the fixing screw comes to lie between the two protrusions.

12. The arrangement according to claim 9, wherein the fixing portion protrudes out of an intermediate space between the two side legs.

13. The arrangement according to claim 9, wherein a stop face of the at least one hook comes into contact with the base leg.

14. The arrangement according to claim 9, wherein the arrangement furthermore comprises a bottom rail and a mounting frame, wherein the bottom rail has a receiving space and wherein the mounting frame can be placed in the receiving space by at least one foot support and is pivotable relative to the bottom rail, wherein at the upper end of the mounting frame, at least one anchor bolt is rotatably mounted in a fixing opening in the mounting frame, wherein the anchor bolt is in engagement with the threaded structure on the fixing portion of the wall anchor.

15. The wall anchor according to claim 9, wherein the hooks are configured such that the wall anchor is insertable in the profile rail by a pivot movement executed about the center axis.

16. The wall anchor according to claim 9, wherein the two hooks are arranged opposite one another with respect to the center axis, wherein each of the hooks has a hook base extending away from the rear face and a hook portion adjoining the hook base and extending away inclined at an angle to the hook base, wherein the hook portion extends away from the hook base towards the outside with respect to the center axis.

17. The wall anchor according to claim 9, wherein one of the hooks has a hook base convexly curved about the center axis and the other of the hooks preferably has a hook base formed as a flat surface.

18. The wall anchor according to claim 9, wherein at least one of the hooks has a stop face which is oriented substantially perpendicularly to the center axis.

19. The wall anchor according to claim 9, wherein a free intermediate space is arranged between the two hooks.

20. The wall anchor according to claim 9, wherein the anchor plate has a side face between the front face and the rear face, wherein the side face at one of the hooks is configured as a rounding and wherein the side face at the other of the hooks is formed with a first surface portion and a second surface portion, wherein the two surface portions are flat surfaces which stand inclined at an angle to one another.

21. The wall anchor according to claim 9, wherein the center axis and the fixing portion lie closer to one of the two hooks than the other of the two hooks; and/or wherein the anchor plate has a region in which neither one of the two hooks nor the fixing portion lies, such that in said region a passage hole can be made for the passage of a screw.

22. The wall anchor according to claim 9, wherein the fixing portion has a length of 25 to 100 mm from the front face to its free end; and/or wherein the wall anchor is formed as one piece; and/or wherein the wall anchor is made of metal, in particular a zinc die-casting, or of plastic, in particular fiber-reinforced or glass fiber-reinforced plastic.

23. The arrangement according to claim 9, wherein the base leg has a plurality of breakthroughs through which a fixing screw can be passed, wherein the screw head of the fixing screw comes to lie between the two protrusions, wherein a free intermediate space is arranged between the two hooks and wherein the screw head extends into said free intermediate space, when the anchor is positioned accordingly.

24. An arrangement comprising a wall anchor and a profile rail, wherein said wall anchor comprises
an anchor plate with a front face and a rear face,
a fixing portion which protrudes from the front face of the anchor plate, which extends along a center axis and has a threaded structure for receiving an anchor bolt, and
two hooks which protrude from the rear face of the anchor plate, wherein the hooks are configured such that the wall anchor can be fixedly connected to the profile rail by means of protrusions of the profile rail, with respect to forces acting in the direction of the center axis,
wherein the profile rail has a base leg and two side legs protruding from the base leg, wherein each of the side legs has one of said protrusions which protrudes into the region between the two side legs and in which said hooks engage, and
wherein the arrangement furthermore comprises a bottom rail and a mounting frame, wherein the bottom rail has a receiving space and wherein the mounting frame can be placed in the receiving space by at least one foot support and is pivotable relative to the bottom rail, wherein at the upper end of the mounting frame, at least one anchor bolt is rotatably mounted in a fixing opening in the mounting frame, wherein the anchor bolt is in engagement with the threaded structure on the fixing portion of the wall anchor.

25. The arrangement according to claim 24, wherein the base leg is formed substantially flat and wherein the protrusion directly adjoins the base leg, and the side leg extends from the protrusion as a flat leg, preferably at an angle of 90° to the base leg.

26. The arrangement according to claim 24, wherein the base leg has a plurality of breakthroughs through which a fixing screw can be passed, wherein the screw head of the fixing screw comes to lie between the two protrusions.

27. The arrangement according to claim 24, wherein the fixing portion protrudes out of an intermediate space between the two side legs.

28. The arrangement according to claim 24, wherein a stop face of the at least one hook comes into contact with the base leg.

29. The wall anchor according to claim 24, wherein the hooks are configured such that the wall anchor is insertable in the profile rail by means of a pivot movement executed about the center axis.

30. The wall anchor according to claim 24, wherein the two hooks are arranged opposite one another with respect to the center axis, wherein each of the hooks has a hook base extending away from the rear face and a hook portion adjoining the hook base and extending away inclined at an angle to the hook base, wherein the hook portion extends away from the hook base towards the outside with respect to the center axis.

31. The wall anchor according to claim 24, wherein one of the hooks has a hook base convexly curved about the center axis and the other of the hooks preferably has a hook base formed as a flat surface.

32. The wall anchor according to claim 24, wherein at least one of the hooks has a stop face which is oriented substantially perpendicularly to the center axis.

33. The wall anchor according to claim 24, wherein a free intermediate space is arranged between the two hooks.

34. The wall anchor according to claim 24, wherein the anchor plate has a side face between the front face and the rear face, wherein the side face at one of the hooks is configured as a rounding and wherein the side face at the other of the hooks is formed with a first surface portion and a second surface portion, wherein the two surface portions are flat surfaces which stand inclined at an angle to one another.

35. The wall anchor according to claim 24, wherein the center axis and the fixing portion lie closer to one of the two hooks than the other of the two hooks; and/or wherein the anchor plate has a region in which neither one of the two hooks nor the fixing portion lies, such that in said region a passage hole can be made for the passage of a screw.

36. The wall anchor according to claim 24, wherein the fixing portion has a length of 25 to 100 mm from the front face to its free end; and/or wherein the wall anchor is formed as one piece; and/or wherein the wall anchor is made of metal, in particular a zinc die-casting, or of plastic, in particular fiber-reinforced or glass fiber-reinforced plastic.

37. The arrangement according to claim 24, wherein the base leg has a plurality of breakthroughs through which a fixing screw can be passed, wherein the screw head of the fixing screw comes to lie between the two protrusions, wherein a free intermediate space is arranged between the two hooks and wherein the screw head extends into said free intermediate space, when the anchor is positioned accordingly.

* * * * *